US012613196B2

(12) United States Patent
Chen et al.

(10) Patent No.: US 12,613,196 B2
(45) Date of Patent: Apr. 28, 2026

(54) BATTERY APPEARANCE DETECTION DEVICE AND BATTERY MANUFACTURING EQUIPMENT

(71) Applicant: CONTEMPORARY AMPEREX TECHNOLOGY CO., LIMITED, Ningde (CN)

(72) Inventors: Qizhi Chen, Ningde (CN); Zerong Cao, Ningde (CN); Lin Ma, Ningde (CN); Pengju Wang, Ningde (CN)

(73) Assignee: CONTEMPORARY AMPEREX TECHNOLOGY CO., LIMITED, Ningde City (CN)

( * ) Notice: Subject to any disclaimer, the term of this patent is extended or adjusted under 35 U.S.C. 154(b) by 0 days.

(21) Appl. No.: 19/265,644

(22) Filed: Jul. 10, 2025

(65) Prior Publication Data

US 2025/0341475 A1 Nov. 6, 2025

Related U.S. Application Data

(63) Continuation of application No. PCT/CN2024/113715, filed on Aug. 21, 2024.

(30) Foreign Application Priority Data

Nov. 29, 2023 (CN) .......................... 202311608385.5

(51) Int. Cl.
*G01N 21/88* (2006.01)
*G01N 21/01* (2006.01)
*H01M 10/04* (2006.01)

(52) U.S. Cl.
CPC ......... *G01N 21/8851* (2013.01); *G01N 21/01* (2013.01); *G01N 21/8806* (2013.01);
(Continued)

(58) Field of Classification Search
CPC ............... G01N 21/8851; G01N 21/01; G01N 21/8806; G01N 2021/0112;
(Continued)

(56) References Cited

U.S. PATENT DOCUMENTS

2024/0426595 A1* 12/2024 Chen .................... H01M 4/139

FOREIGN PATENT DOCUMENTS

CN 105548186 A * 5/2016 ............. G01N 21/84
CN 112240887 A 1/2021
(Continued)

OTHER PUBLICATIONS

International Search Report dated Oct. 22, 2024 for application PCT/CN2024/113715.
(Continued)

*Primary Examiner* — Tri T Ton
(74) *Attorney, Agent, or Firm* — Ladas & Parry, LLP

(57) ABSTRACT

The battery appearance detection device includes a bracket, a first photographing component, a second photographing component, and an identification device. The first photographing component is mounted on the bracket and is configured to capture an appearance photo of a first detected member. The second photographing component is mounted on the bracket. The second photographing component is configured to capture an appearance photo of a second detected member. The first detected member and the second detected member have different shapes. The identification device is signal-connected to the first photographing component and the second photographing component. The identification device is configured to: identify an appearance defect of the first detected member based on the photo captured by the first photographing component, and identify an appearance defect of the second detected member based on the photo captured by the second photographing com-
(Continued)

ponent. The battery manufacturing equipment includes the battery appearance detection device.

12 Claims, 9 Drawing Sheets

(52) U.S. Cl.
  CPC ................. *G01N 2021/0112* (2013.01); *G01N 2021/8887* (2013.01); *G01N 2201/021* (2013.01); *G01N 2201/061* (2013.01); *H01M 10/0404* (2013.01)

(58) Field of Classification Search
  CPC ..... G01N 2021/8887; G01N 2201/021; G01N 2201/061; H01M 10/0404
  See application file for complete search history.

(56) References Cited

FOREIGN PATENT DOCUMENTS

| CN | 212514319 | U |   | 2/2021 |   |   |
|---|---|---|---|---|---|---|
| CN | 113092489 | A |   | 7/2021 |   |   |
| CN | 113218945 | A |   | 8/2021 |   |   |
| CN | 115436383 | A |   | 12/2022 |   |   |
| CN | 115511825 | A |   | 12/2022 |   |   |
| CN | 115656197 | A |   | 1/2023 |   |   |
| CN | 218646870 | U |   | 3/2023 |   |   |
| CN | 218726727 | U | * | 3/2023 | ........ | G01N 21/8806 |
| KR | 20220052058 | A |   | 4/2022 |   |   |

OTHER PUBLICATIONS

Written Opinion dated Oct. 22, 2024 for application PCT/CN2024/113715.

* cited by examiner

BATTERY APPEARANCE DETECTION DEVICE AND BATTERY MANUFACTURING EQUIPMENT

The present application is a continuation of International application PCT/CN2024/113715 filed on Aug. 21, 2024 that claims priority to Chinese Application No. 202311608385.5, filed on Nov. 29, 2023. The content of these applications is incorporated herein in its entirety by reference.

TECHNICAL FIELD

The present application relates to the field of battery technologies, and in particular, to a battery appearance detection device and battery manufacturing equipment.

BACKGROUND

Energy conservation and emission reduction are the key to the sustainable development of the automotive industry, and electric vehicles have become an important component of the sustainable development of the automotive industry due to energy saving and environment protection advantages thereof. For electric vehicles, a battery technology is an important factor for the development thereof.

A battery includes a cell, the cell is provided with a post, and manufacturing quality of the post directly affects overall manufacturing quality of the battery, which affects use safety of the battery.

The above statement merely provides the background information related to the present application and do not necessarily constitute the prior art.

SUMMARY

Provided in the present application are a battery appearance detection device and battery manufacturing equipment, so that accuracy of appearance detection can be effectively improved.

According to a first aspect of the present application, provided in the present application is a battery appearance detection device, comprising: a bracket, a first photographing component, a second photographing component, and an identification device. The first photographing component is mounted on the bracket. The first photographing component is configured to capture an appearance photo of a first detected member. The second photographing component is mounted on the bracket. The second photographing component is configured to capture an appearance photo of a second detected member. The first detected member and the second detected member have different shapes. The identification device is signal-connected to the first photographing component and the second photographing component. The identification device is configured to: identify an appearance defect of the first detected member based on the photo captured by the first photographing component, and identify an appearance defect of the second detected member based on the photo captured by the second photographing component.

The first photographing component and the second photographing component are disposed, so that the first detected member and the second detected member can be detected separately. This improves compatibility of the detection device with different types of detected members, expands an application range of the detection device, reduces time required for switching and retooling in a production process, and helps improve efficiency of appearance detection and production efficiency.

The first photographing component and the second photographing component respectively detects the first detected member and the second detected member, so that a dedicated photographing component can be allocated to each of the first detected member and the second detected member. This helps improve adaptability between the photographing component and the detected member, and overcomes problems such as a poor imaging effect and low detection accuracy due to poor adaptability.

The identification device is disposed, so that the appearance defects of the first detected member and the second detected member can be identified based on the photos captured by the first photographing component and the second photographing component, thereby providing a determining basis for a subsequent assembly or molding process, and preventing a defective detected member from being entering a downstream process and affecting overall manufacturing quality of the battery.

In some embodiments, the first detected member has a rectangular cuboid shape, and the second detected member has a cylindrical shape.

The rectangular cuboid shape and the cylindrical shape are two relatively common shapes of the detected member. In other embodiments, the detected member may have a semi-cylindrical shape, a triangular prism shape, or another shape. Parameters such as a number and a placement position of the first photographing component and the second photographing component can be adjusted based on a shape of the detected member, so as to improve imaging quality and improve accuracy of appearance detection.

In some embodiments, the first photographing component comprises a plurality of first connection plates, the second photographing component comprises a plurality of second connection plates, both the first connection plate and the second connection plate are mounted on the bracket, the battery appearance detection device comprises a plurality of photographing devices, and the photographing device is configured to be detachably mounted to the first connection plate and detachably mounted to the second connection plate.

The photographing device is configured to be detachably mounted to the first connection plate and detachably mounted to the second connection plate, so that the photographing device can serve as an integral part of the first photographing component and can serve as an integral part of the second photographing component. This achieves the purpose of sharing the photographing device by the first photographing component and the second photographing component, and is beneficial for cost control.

In some embodiments, the first photographing component comprises four photographing devices, the four photographing devices are equally divided into two groups, and the two groups of photographing devices are arranged opposite to each other. This placement facilitates photographing of the four side surfaces of the first detected member in a rectangular cuboid shape, and facilitates photographing by applying a principle of specular reflection of optical imaging without interfering with arrangement of the photographing device of the second photographing component.

In some embodiments, central axes of the four photographing devices are respectively collinear with centers of side surfaces that are of the first detected member and that are photographed by the four photographing devices. This placement helps improve image quality of each side surface.

In some embodiments, an angle between the central axis of the photographing device and a perpendicular line perpendicular to the side surface that is of the first detected member and that is photographed by the photographing device is less than 90°. This placement helps ensure that overall image quality of a corresponding side surface is relatively high, especially that image quality of an edge of the first detected member is relatively good, so as to observe whether the edge of the first detected member has defects such as stringing and burr.

In some embodiments, a depth of field D of the photographing device is greater than or equal to a larger value between d1*sin α and d2*sin β, d1 is the length of a first cross section that is of the first detected member and that is perpendicular to a vertical direction, d1 is the width of the first cross section, γ=arctan (d1/2d2), and σ=arctan (d2/2d1). This placement can effectively ensure that an imaging range of the photographing device comprises entire ranges of a first side surface and a second side surface, thereby resolving a problem of unclear imaging caused by a small photographing area, which otherwise makes it difficult to determine whether there is a defect.

In some embodiments, the second photographing component comprises four photographing devices arranged at regular intervals in a circumferential direction. This placement facilitates photographing of the second detected member in a cylindrical shape without interfering with arrangement of the photographing device of the first photographing component.

In some embodiments, the battery appearance detection device further comprises a first adjustment component, wherein the first adjustment component comprises a first adjustment member, a second adjustment member, and a third adjustment member, the first photographing component and/or the second photographing component comprise/ comprises a photographing device, the first adjustment member is configured to adjust a position of the photographing device in a first direction, the second adjustment member is configured to adjust a position of the photographing device in a second direction, the third adjustment member is configured to adjust a position of the photographing device in a third direction, the first direction is parallel to the vertical direction, the second direction is a direction toward or away from the first detected member or the second detected member, the second direction is perpendicular to the first direction, and the third direction is perpendicular to both the first direction and the second direction.

The first adjustment member, the second adjustment member, and the third adjustment member are disposed, so that the position of the photographing device can be adjusted in three mutually perpendicular directions, and a posture of the photographing device can be adjusted in all directions, so as to take high-quality photos, thereby providing a basis for improving quality of appearance detection.

In some embodiments, the first photographing component comprises the second adjustment member and the third adjustment member, and the second photographing component comprises the first adjustment member and the second adjustment member.

This placement enables the position of the photographing device in the first photographing component to be adjusted in the second direction and the third direction, and enables the position of the photographing device in the second photographing component to be adjusted in the first direction and the second direction.

In some embodiments, a number of the first adjustment components is the same as a number of the photographing devices, to independently adjust a position of each photographing device by using the first adjustment component.

A dedicated first adjustment component is disposed for each photographing device, so that the position of each photographing device can be independently adjusted, and position adjustment of each photographing device is not limited by position arrangement of another photographing device. This helps improve photographing quality.

In some embodiments, the first adjustment member is provided with a first mounting hole for connecting to the bracket and a second mounting hole for connecting to the second adjustment member, the second adjustment member is provided with a third mounting hole for connecting to the first adjustment member and a fourth mounting hole for connecting to the photographing device, the third adjustment member is provided with a fifth mounting hole for connecting to the bracket and a sixth mounting hole for connecting to the second adjustment member, the second mounting hole is an oblong hole whose length direction extends in the first direction, the fourth mounting hole is an oblong hole whose length direction extends in the second direction, and the sixth mounting hole is an oblong hole whose length direction extends in the third direction.

The first adjustment member is connected to the bracket through the first mounting hole, the second adjustment member is connected to the first adjustment member through the second mounting hole and the third mounting hole, the third adjustment member is connected to the bracket through the fifth mounting hole, and the third adjustment member is connected to the second adjustment member through the sixth mounting hole.

In some embodiments, the first adjustment member is provided with a seventh mounting hole for connecting to the second adjustment member, the seventh mounting hole is a circular hole, and the second mounting hole is arc-shaped; and/or the length direction of the second mounting hole is parallel to the second direction; and/or the third adjustment member is provided with an eighth mounting hole for connecting to the second adjustment member, the eighth mounting hole is a circular hole, and the sixth mounting hole is arc-shaped.

The seventh mounting hole is disposed, so that the first adjustment member and the second adjustment member can be connected through the second mounting hole and the seventh mounting hole. The seventh mounting hole is a circular hole, and the second mounting hole is arc-shaped, so that the first adjustment member can swing with respect to the second adjustment member in the length direction of the second mounting hole around a connection position of the seventh mounting hole, thereby adjusting the position of the photographing device in the first direction.

The eighth mounting hole is disposed, so that the second adjustment member and the third adjustment member can be connected through the sixth mounting hole and the eighth mounting hole. The eighth mounting hole is a circular hole, and the sixth mounting hole is arc-shaped, so that the third adjustment member can swing with respect to the second adjustment member in the length direction of the sixth mounting hole around a connection position of the eighth mounting hole, thereby adjusting the position of the photographing device in the third direction.

In some embodiments, at least one of the second mounting hole, the fourth mounting hole, and the sixth mounting hole is provided with a scale. The scale is disposed, so that a magnitude of position adjustment can be more accurately controlled, which helps implement more accurate adjustment.

In some embodiments, the battery appearance detection device further comprises a first light source and a second light source that are mounted on the bracket, wherein the first light source has a strip shape, and the second light source has a ring shape.

The strip-shaped first light source and the ring-shaped second light source are disposed, so that strip light and ring light can be respectively provided for the first photographing component and the second photographing component, to improve brightness on a side surface of the detected member, increase a contrast between a defective portion and a non-defective portion, and improve imaging quality.

In some embodiments, there are two first light sources, the two first light sources are arranged opposite to each other, the first detected member has a rectangular cuboid shape, and the first light source is substantially parallel to one of diagonals of the first detected member.

Two first light sources are disposed, and the two first light sources are arranged opposite to each other and are substantially parallel to one of the diagonals of the first detected member, so that an imaging requirement can be substantially met, and costs can be greatly reduced as compared with a solution in which four first light sources are disposed.

In some embodiments, the battery appearance detection device further comprises a second adjustment component, wherein the second adjustment component is configured to adjust a position of the first light source in at least one of a fourth direction, a fifth direction, and a sixth direction, the fourth direction is parallel to the vertical direction, the fifth direction is perpendicular to the sixth direction, and both the fifth direction and the sixth direction are perpendicular to the fourth direction.

The second adjustment component is disposed, so that the position of the first light source can be adjusted in three mutually perpendicular directions, and the detection device can adjust the position of the first light source based on requirements of the first photographing component and the second photographing component, so as to achieve a good imaging effect.

In some embodiments, the second adjustment component comprises a mounting base, a first mounting plate, and a second mounting plate, the first light source is mounted on the mounting base, the mounting base is provided with a first connection hole for connecting to the first mounting plate, the first mounting plate is provided with a second connection hole for connecting to the mounting base and a third connection hole for connecting to the second mounting plate, the second mounting plate is provided with a fourth connection hole for connecting to the first mounting plate and a fifth connection hole for connecting to the bracket, the first connection hole is an oblong hole whose length direction extends in the fifth direction, the second connection hole is an oblong hole whose length direction extends in the fourth direction, and at least one of the third connection hole and the fourth connection hole is an oblong hole whose length direction extends in the sixth direction.

The position of the first light source in the fifth direction can be adjusted by disposing the first connection hole as an oblong hole, the position of the first light source in the fourth direction can be adjusted by disposing the second connection hole as an oblong hole, and the position of the first light source in the sixth direction can be adjusted by disposing at least one of the third connection hole and the fourth connection hole as an oblong hole.

In some embodiments, the first light source is disposed below the first photographing component.

The first light source is disposed below the first photographing component, so that interference between the first light source and the first photographing component can be avoided. In addition, it helps use the first light source below to illuminate the first detected member and the second detected member, so as to improve imaging quality of the first photographing component and the second photographing component.

In some embodiments, the battery appearance detection device further comprises a third adjustment component, wherein the third adjustment component is configured to adjust a position of the second light source in the vertical direction.

The third adjustment component is disposed, so that the position of the second light source in the vertical direction can be adjusted, to facilitate adjustment of the position of the second light source as required.

According to a second aspect, provided in the present application is battery manufacturing equipment, comprising the above-described battery appearance detection device.

The above description is merely an overview of the technical solutions of the present application. For a clearer understanding of the technical means of the present application, the present application can be carried out in accordance with the content of the description, and in order to make the above and other objectives, characteristics, and advantages of the present application apparent and comprehensible, specific embodiments of the present application are described below.

DESCRIPTION OF DRAWINGS

In order to more clearly illustrate the technical solutions of the embodiments of the present application, the drawings required to be used in the embodiments of the present application will be briefly introduced below. Obviously, the drawings described below are only some embodiments of the present application. For persons of ordinary skill in the art, other drawings can also be obtained from the drawings without creative work.

Figure 1:
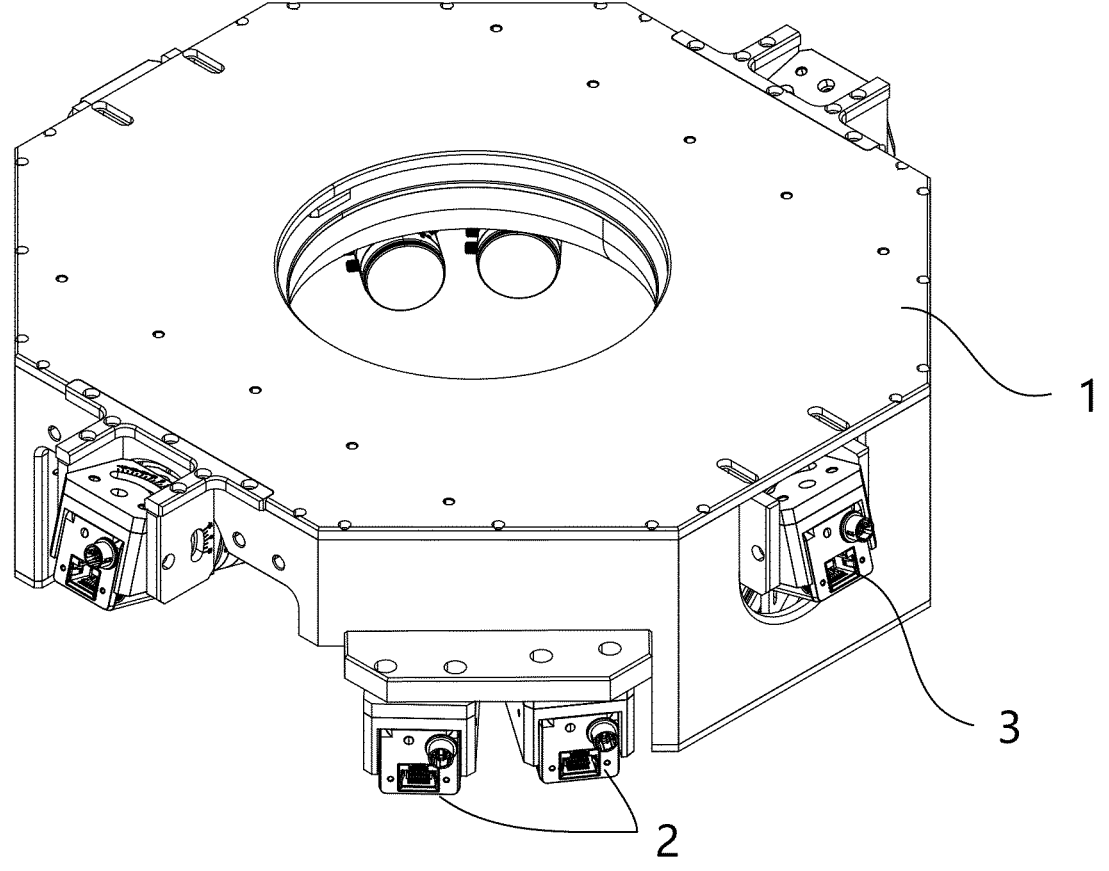
FIG. 1 is a schematic diagram of a structure of some embodiments of a battery appearance detection device disclosed in the present application.

In the drawings, the figures are not drawn to actual scale.

Descriptions of reference numerals: 1. bracket; 11. bracket body; 12. cover plate; 2. first photographing component; 21. first connection plate; 3. second photographing component; 31. second connection plate; 4. identification device; 5. first adjustment component; 51. first adjustment member; 511. first mounting hole; 512. second mounting hole; 513. seventh mounting hole; 52. second adjustment member; 521. third mounting hole; 522. fourth mounting hole; 523. ninth mounting hole; 524. tenth mounting hole; 525. eleventh mounting hole; 53. third adjustment member; 531. fifth mounting hole; 532. sixth mounting hole; 533. eighth mounting hole; 6. first light source; 7. second light source; 8. second adjustment component; 81. mounting base; 811. first connection hole; 82. first mounting plate; 821. second connection hole; 822. third connection hole; 83. second mounting plate; 831. fourth connection hole; 832. fifth connection hole; 9. third adjustment component; 91. third mounting plate; 92. fourth mounting plate; 10. first detected member; 20. second detected member.

DETAIL DESCRIPTION

Embodiments of the technical solutions of the present application are described in detail below with reference to the drawings. The following embodiments are only used to more clearly illustrate the technical solutions of the present application, and thus are used as examples only, and are not intended to limit the protection range of the present application.

Embodiments of the technical solutions of the present application are described in detail below with reference to the drawings. The following embodiments are only used to more clearly illustrate the technical solutions of the present application, and thus are used as examples only, and are not intended to limit the protection range of the present application.

Unless defined otherwise, all technical and scientific terms used herein have the same meaning as commonly understood by a person skilled in the art to which the present application belongs; the terms used herein are used for describing particular embodiments only and are not intended to limit the present application; and the terms "comprising", "including", and "having" and any variations thereof in the description, claims and the above drawings of the present application are intended to cover non-exclusive inclusion.

In the description of the embodiments of the present application, the technical terms "first", "second", and the like are used only for distinguishing between different objects, but cannot be construed to indicate or imply relative importance or implicitly indicate the number, specific order, or primary/secondary relationship of indicated technical features. In addition, the term "perpendicular" is not perpendicular in the strict sense, but is within an allowable range of error. "Parallel" is not parallel in the strict sense, but is within an allowable range of error.

Reference to "an embodiment" herein means that a particular feature, structure, or characteristic described with reference to the embodiment can be included in at least one embodiment of the present application. The phrase in various places in the description does not necessarily all refer to the same embodiment, or a separate or alternative embodiment mutually exclusive of other embodiments. It is explicitly and implicitly understood by a person skilled in the art that the embodiments described herein may be combined with other embodiments.

In the description of the embodiments of the present application, the term "and/or" merely describes an association relationship of associated objects, indicating that three relationships may exist, for example, A and/or B may mean that A exists alone, A and B exist simultaneously, or B exists alone. In addition, the character "/" herein generally indicates that associated objects are in a "or" relationship.

In the description of the embodiments of the present application, the term "a plurality of" means two or more unless specifically defined otherwise. Similarly, "a plurality of sets" means two or more sets, and "a plurality of sheets" means two or more sheets, unless specifically defined otherwise.

In the description of the embodiments of the present application, orientations or positional relationships indicated by the technical terms such as "center", "longitudinal", "transverse", "length", "width", "thickness", "upper", "lower", "front", "rear", "left", "right", "vertical", "horizontal", "top", "bottom", "inner", "outer", "clockwise", "counter-clockwise", "axial", "radial", "circumferential", and the like are based on orientations or positional relationships shown in the drawings, and are merely for convenience of description of the embodiments of the present application and simplified description, and do not indicate or imply that an indicated apparatus or element must have a specific orientation or be configured and operated in a specific orientation, and thus should not be construed as limitations on the embodiments of the present application.

In the description of the embodiments of the present application, unless explicitly specified and defined otherwise, the terms "mount", "couple", "connect", and "fasten" should be broadly understood, for example, they may be a fixed connection, a detachable connection, or an integral connection; or may be a mechanical connection, or an electrical connection; or may be a direct connection, or an indirect connection via an intermediate medium, or an internal communication between two elements or interaction between two elements. A person of ordinary skill in the art may understand the specific meanings of the above terms in the embodiments of the present application according to specific situations.

At present, in view of the development of the market, the use of power batteries is becoming increasingly more widespread. Power batteries are used not only in energy storage power systems such as hydropower, thermal power, wind power, and solar power plants, but also in electric tools such as electric bicycles, electric motorcycles, and electric vehicles, as well as military equipment, aerospace, and many other fields. As an application field of power batteries continues to expand, a market demand for power batteries continues to increase.

A power battery includes a cell. The cell includes a housing, an electrode component, and a post. The electrode component is disposed inside the housing. The post is an output terminal of the battery. An inner end of the post is received within the housing and is connected to a connection piece on the electrode component, and an outer end of the post protrudes outside the housing and is connected to a bus bar or another external electronic element.

In a production process, defects such as external plastic burns, scratches, breakages, bare metal, or stringing at an edge may occur, and these defects greatly affects quality of the post and affects use safety. Therefore, appearance quality of the post needs to be detected on a production line.

With increasing production capacity requirements, a cycle time requirement for test equipment is also increasing. Therefore, how to accurately detect a cell with a defective post and avoid assembly abnormality caused by flowing into a subsequent process is a point of great importance in the industry of automatic detection of a lithium battery.

Currently, in related technologies, an appearance of the post of the cell is generally detected by using a single area-array CCD through stop-and-shoot detection. Compatibility with different types of posts is poor, detection accuracy for some types of posts is low, and a requirement for quality control cannot be met.

In view of the above, provided in the present application is a battery appearance detection device with an improved structure. The detection device includes two sets of photographing components. The two sets of photographing components are separately used to detect different types of detected members, thereby improving compatibility of the detection device with different types of detected members. In addition, different types of detected members are photographed by using different photographing components, so that adaptability between the photographing component and the detected member can be improved, structural arrangement of the photographing component and the like can be adjusted based on a type of detected member. This helps improve photographing accuracy and further improve accuracy of appearance quality detection.

Further provided in the present application is battery manufacturing equipment, and the equipment includes the above-described battery appearance detection device.

Some embodiments of the battery appearance detection device provided in the present application are described in detail below.

Referring to FIG. 1 to FIG. 4, in some embodiments of the battery appearance detection device provided in the present application, the detection device includes: a bracket 1, a first photographing component 2, a second photographing component 3, and an identification device 4. The first photographing component 2 is mounted on the bracket 1. The first photographing component 2 is configured to capture an appearance photo of a first detected member 10. The second photographing component 3 is mounted on the bracket 1. The second photographing component 3 is configured to capture an appearance photo of a second detected member 20. The first detected member 10 and the second detected member 20 have different shapes. The identification device 4 is signal-connected to the first photographing component 2 and the second photographing component 3. The identification device 4 is configured to: identify an appearance defect of the first detected member 10 based on the photo captured by the first photographing component 2, and identify an appearance defect of the second detected member 20 based on the photo captured by the second photographing component 3.

The first photographing component 2 and the second photographing component 3 are disposed, so that the first detected member 10 and the second detected member 20 can be detected separately. This improves compatibility of the detection device with different types of detected members, expands an application range of the detection device, reduces time required for switching and retooling in a production process, and helps improve efficiency of appearance detection and production efficiency.

The first photographing component 2 and the second photographing component 3 respectively detects the first detected member 10 and the second detected member 20, so that a dedicated photographing component can be allocated to each of the first detected member 10 and the second detected member 20. This helps improve adaptability between the photographing component and the detected member, and overcomes problems such as a poor imaging effect and low detection accuracy due to poor adaptability.

The identification device 4 is disposed, so that the appearance defects of the first detected member 10 and the second detected member 20 can be identified based on the photos captured by the first photographing component 2 and the second photographing component 3, thereby providing a determining basis for a subsequent assembly or molding process, and preventing a defective detected member from being entering a downstream process and affecting overall manufacturing quality of the battery.

The identification device 4 may be a controller. A picture of a non-defective detected member is stored in the controller in advance. The photos captured by the first photographing component 2 and the second photographing component 3 are compared with the picture of the non-defective detected member, so that it can be determined whether there are any appearance defects in the first detected member 10 and the second detected member 20. Alternatively, parameters related to a non-defective detected member may be stored in the controller in advance. Corresponding parameters in the photos captured by the first photographing component 2 and the second photographing component 3 are compared with the parameters of the non-defective detected member, so that it can be determined whether there are any appearance defects in the first detected member 10 and the second detected member 20.

In some embodiments, the first detected member 10 has a rectangular cuboid shape, and the second detected member 20 has a cylindrical shape.

The rectangular cuboid shape and the cylindrical shape are two relatively common shapes of the detected member.

In other embodiments, the detected member may have a semi-cylindrical shape, a triangular prism shape, or another shape. Parameters such as a number and a placement position of the first photographing component 2 and the second photographing component 3 can be adjusted based on a shape of the detected member, so as to improve imaging quality and improve accuracy of appearance detection.

The first detected member 10 has a rectangular cuboid shape, and defects such as stringing and burr are likely to occur at an edge thereof. The second detected member 20 has a cylindrical shape, a surface thereof is covered with plastic, and defects such as plastic burns, scratches, breakages, deformation, or bare metal are likely to occur.

Figure 3:
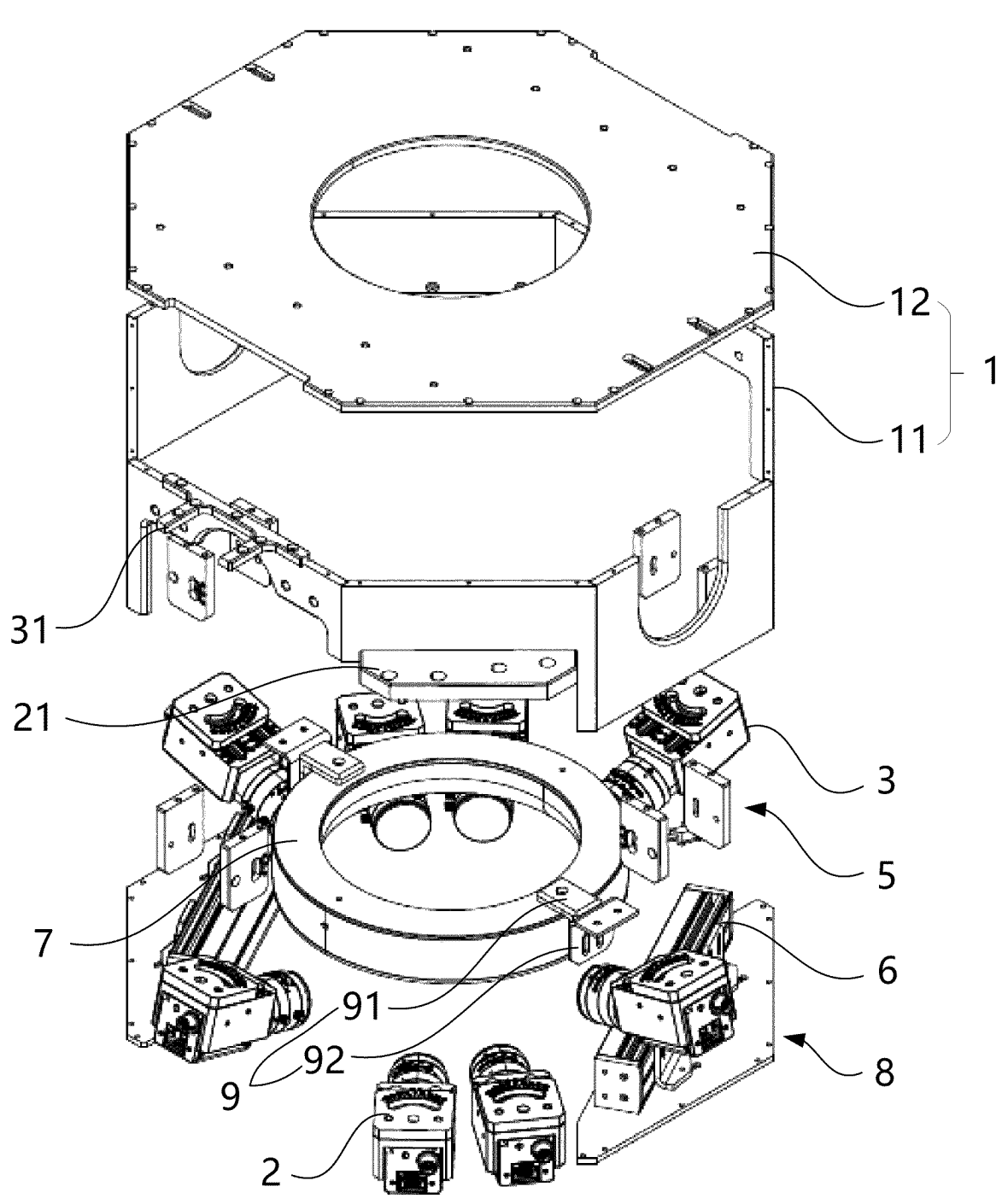
FIG. 3 is an exploded view of some embodiments of a battery appearance detection device disclosed in the present application.

As shown in FIG. 3, in some embodiments, the first photographing component 2 includes a plurality of first connection plates 21, the second photographing component 3 includes a plurality of second connection plates 31, both the first connection plate 21 and the second connection plate 31 are mounted on the bracket 1, the battery appearance detection device includes a plurality of photographing devices, and the photographing device is configured to be detachably mounted to the first connection plate 21 and detachably mounted to the second connection plate 31.

The photographing device is configured to be detachably mounted to the first connection plate 21 and detachably mounted to the second connection plate 31, so that the photographing device can serve as an integral part of the first photographing component 2 and can serve as an integral part of the second photographing component 3. This achieves the purpose of sharing the photographing device by the first photographing component 2 and the second photographing component 3, and is beneficial for cost control.

Furthermore, both the integral part (first connection plate 21) of the first photographing component 2 and the integral part (second connection plate 31) of the second photographing component 3 are mounted on the bracket 1, so that the detection device can be used to detect both the first detected member 10 and the second detected member 20. This improves compatibility of the detection device with different types of detected members, and expands an application range of the detection device. When the embodiment of the battery appearance detection device provided in the present application is disposed on a production line, if both the first detected member 10 and the second detected member 20 are present on the production line, different detected members can be photographed and detected through switching between the first photographing component 2 and the second photographing component 3 without frequent replacement of the detection device. This greatly shortens time required for switching and retooling, and improves detection efficiency.

In addition, both the first connection plate 21 and the second connection plate 31 are mounted on the bracket 1, so that different and fixed working positions can be set for the first photographing component 2 and the second photographing component 3. When switching is performed between the first photographing component 2 and the second photographing component 3, the first photographing component 2 and the second photographing component 3 can be assembled by mounting the photographing device on the first connection plate 21 or the second connection plate 31.

If a cost problem is not taken into consideration, in other embodiments, the first photographing component 2 and the second photographing component 3 may not share the photographing device, and corresponding photographing devices may be respectively mounted on a plurality of first connection plates 21 and a plurality of second connection plates 31, so that the first photographing component 2 and the second photographing component 3 can be in a working state at any time. This can further shorten time required for switching and retooling, and further improve detection efficiency.

One or a plurality of photographing devices may be mounted on each first connection plate 21. One or a plurality of photographing devices may also be mounted on each second connection plate 31.

The photographing device may be a CCD camera or another type of camera.

Figure 2:
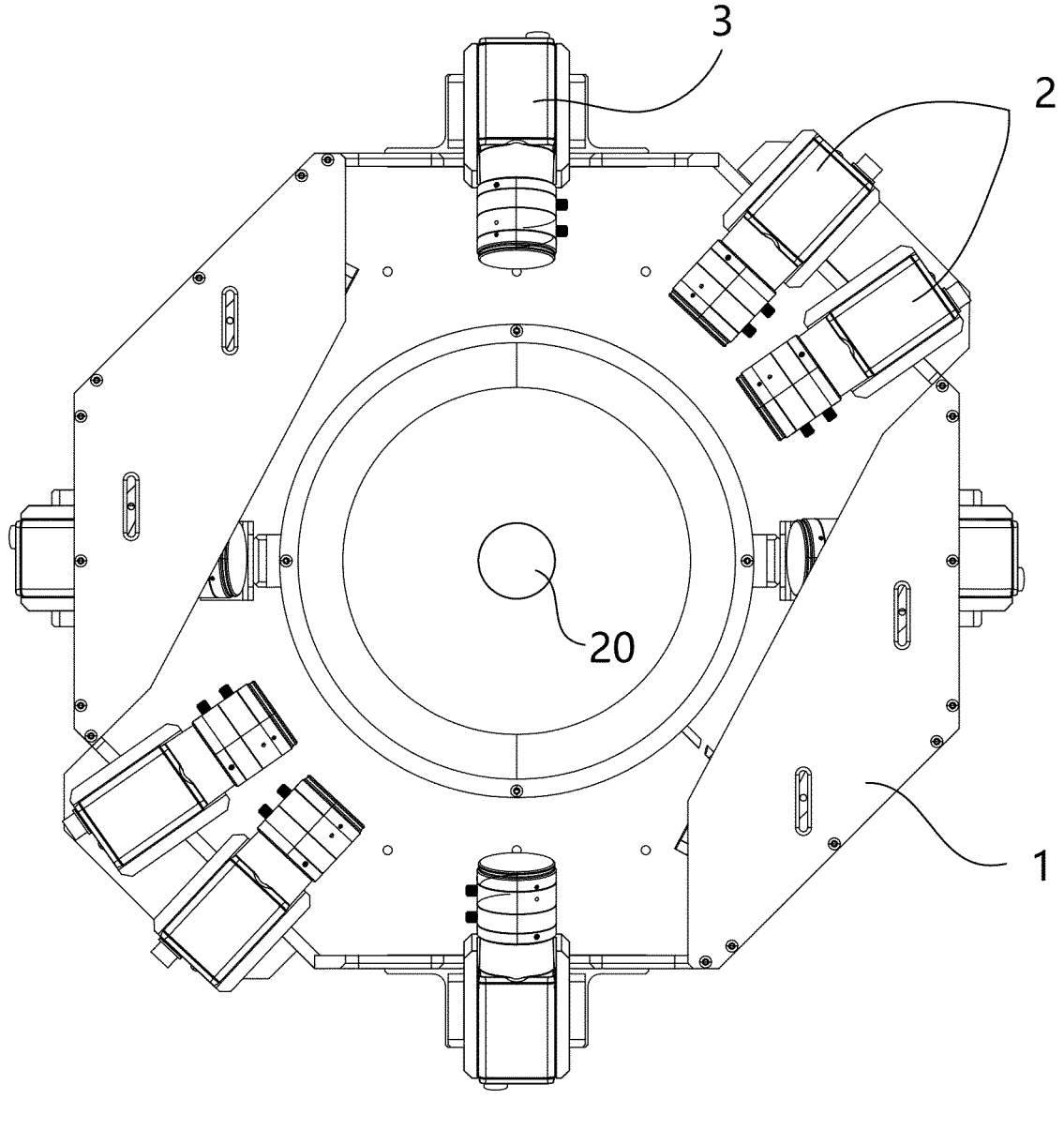
FIG. 2 is a partial cross-sectional schematic diagram of some embodiments of a battery appearance detection device disclosed in the present application.

As shown in FIG. 1 and FIG. 2, in some embodiments, the first photographing component 2 includes four photographing devices, the four photographing devices are equally divided into two groups, and the two groups of photographing devices are arranged opposite to each other. This placement facilitates photographing of the four side surfaces of the first detected member 10 in a rectangular cuboid shape, and facilitates photographing by applying a principle of specular reflection of optical imaging without interfering with arrangement of the photographing device of the second photographing component 3.

In other embodiments, a number of photographing devices in the first photographing component 2 may be two, three, five, or more.

In some embodiments, central axes of the four photographing devices are respectively collinear with centers of side surfaces that are of the first detected member 10 and that are photographed by the four photographing devices. This placement helps improve image quality of each side surface.

Figure 9:
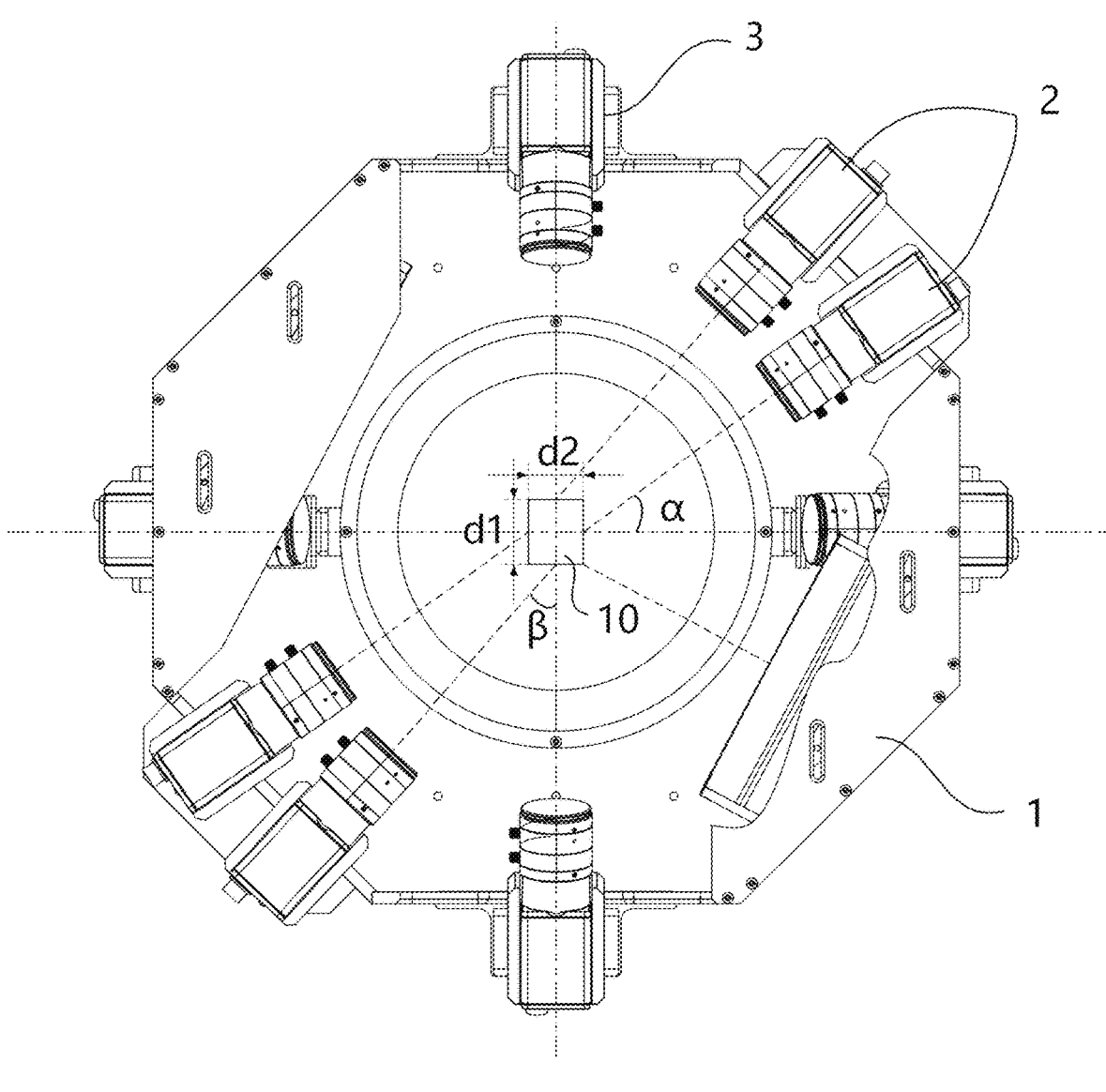
FIG. 9 is a schematic diagram of a photographing angle of some embodiments of a battery appearance detection device disclosed in the present application.

As shown in FIG. 9, in some embodiments, an angle between the central axis of the photographing device and a perpendicular line perpendicular to the side surface that is of the first detected member 10 and that is photographed by the photographing device is less than 90°. This placement helps ensure that overall image quality of a corresponding side surface is relatively high, especially that image quality of an edge of the first detected member 10 is relatively good, so as to observe whether the edge of the first detected member 10 has defects such as stringing and burr.

Figure 10:
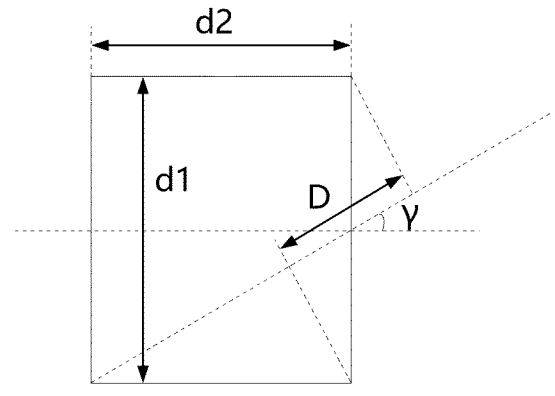
FIG. 10 and FIG. 11 are schematic diagrams of a length range of a depth of field in some embodiments of a battery appearance detection device disclosed in the present application.
Figure 11:
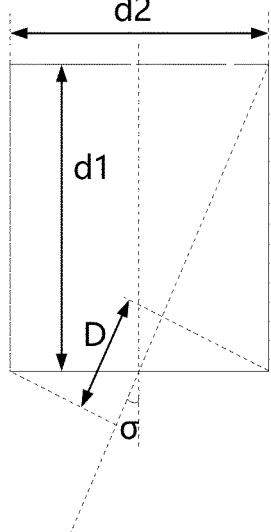

As shown in FIG. 10 and FIG. 11, in some embodiments, a depth of field D of the photographing device is greater than or equal to a larger value between d1*sin $\alpha$ and d2*sin $\beta$, d1 is the length of a first cross section that is of the first detected member 10 and that is perpendicular to a vertical direction, d2 is the width of the first cross section, $\gamma$-arctan d1/2d2, and $\sigma$=arctan d2/2d1. This placement can effectively ensure that an imaging range of the photographing device includes entire ranges of a first side surface and a second side surface, thereby resolving a problem of unclear imaging caused by a small photographing area, which otherwise makes it difficult to determine whether there is a defect.

In some embodiments, the second photographing component 3 includes four photographing devices arranged at regular intervals in a circumferential direction. This placement facilitates photographing of the second detected member 20 in a cylindrical shape without interfering with arrangement of the photographing device of the first photographing component 2.

In other embodiments, a number of photographing devices in the second photographing component 3 may be two, three, five, or more.

Figure 5:
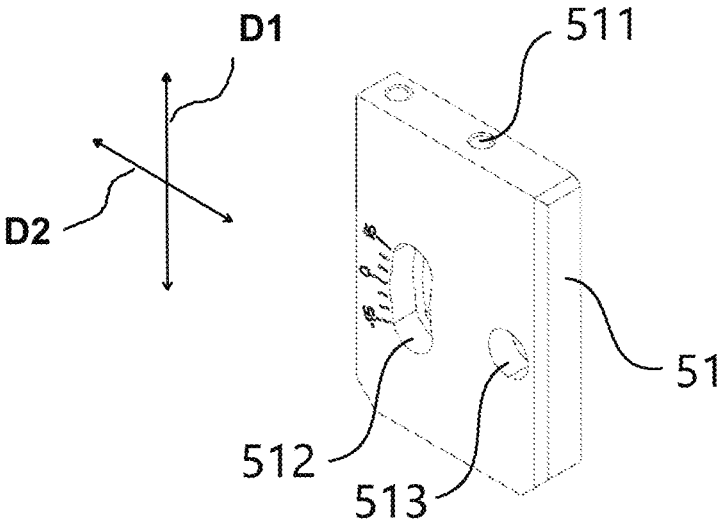
FIG. 5 is a schematic diagram of a structure of a first adjustment member in some embodiments of a battery appearance detection device disclosed in the present application.
Figure 6:
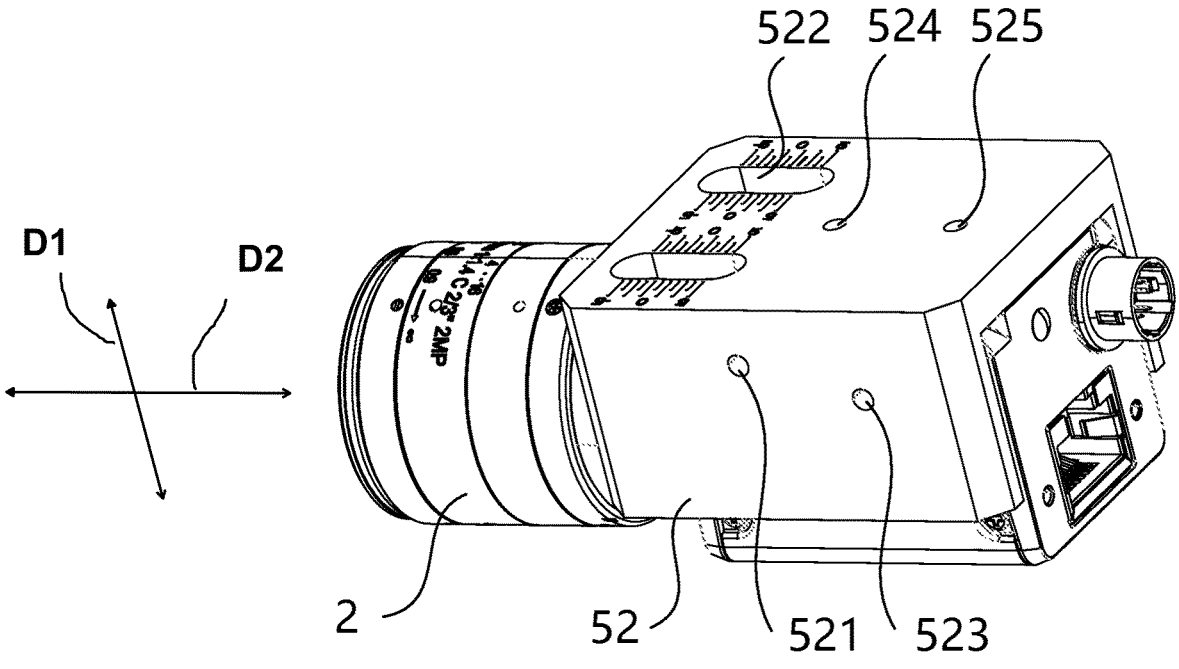
FIG. 6 is a schematic diagram of a structure of a second adjustment member in some embodiments of a battery appearance detection device disclosed in the present application.
Figure 7:
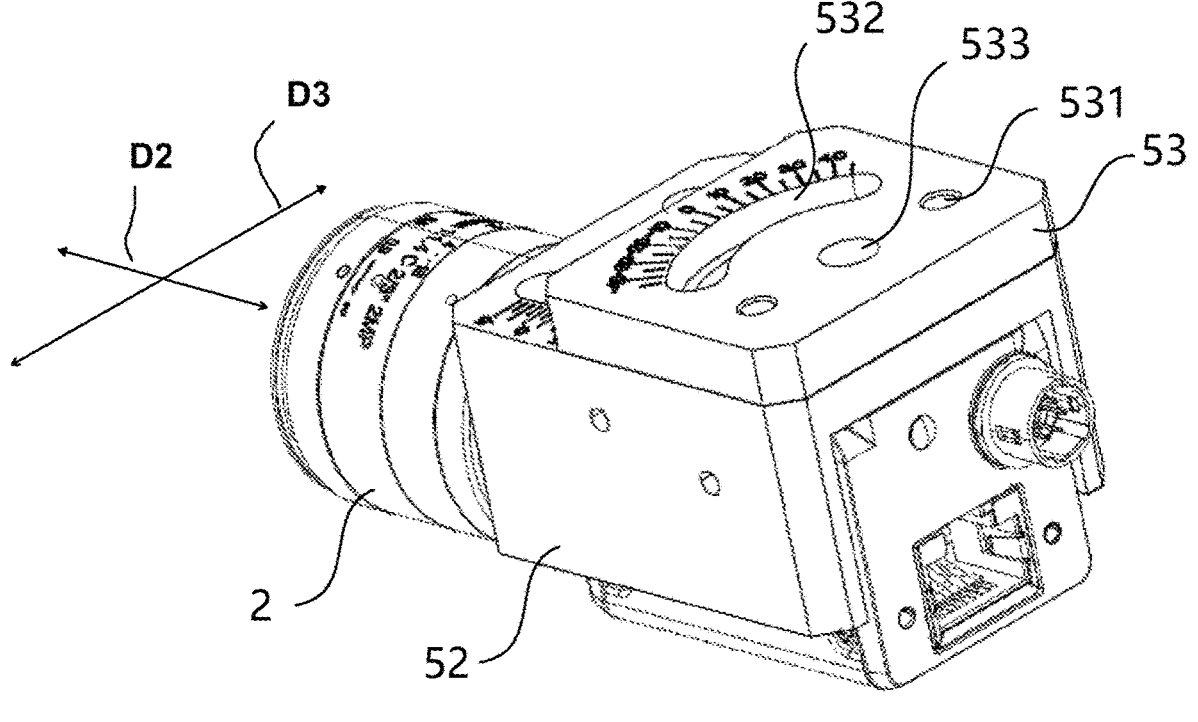
FIG. 7 is a schematic diagram of a structure of a second adjustment member and a third adjustment member in some embodiments of a battery appearance detection device disclosed in the present application.

As shown in FIG. 5 to FIG. 7, in some embodiments, the battery appearance detection device further includes a first adjustment component 5, where the first adjustment component 5 includes a first adjustment member 51, a second adjustment member 52, and a third adjustment member 53, the first photographing component 2 and/or the second photographing component 3 include/includes a photographing device, the first adjustment member 51 is configured to adjust a position of the photographing device in a first direction D1, the second adjustment member 52 is configured to adjust a position of the photographing device in a second direction D2, the third adjustment member 53 is configured to adjust a position of the photographing device in a third direction D3, the first direction D1 is parallel to the vertical direction, the second direction D2 is a direction toward or away from the first detected member 10 or the second detected member 20, the second direction D2 is perpendicular to the first direction D1, and the third direction D3 is perpendicular to both the first direction D1 and the second direction D2.

The first adjustment member 51, the second adjustment member 52, and the third adjustment member 53 are disposed, so that the position of the photographing device can be adjusted in three mutually perpendicular directions, and a posture of the photographing device can be adjusted in all directions, so as to take high-quality photos, thereby providing a basis for improving quality of appearance detection.

In some embodiments, each of the first photographing component 2 and the second photographing component 3 includes the first adjustment member 51, the second adjustment member 52, and the third adjustment member 53, so that the position of the photographing device in each of the first photographing component 2 and the second photographing component 3 can be adjusted in three mutually perpendicular directions.

In some other embodiments, the first photographing component 2 includes the second adjustment member 52 and the third adjustment member 53, and the second photographing component 3 includes the first adjustment member 51 and the second adjustment member 52.

This placement enables the position of the photographing device in the first photographing component 2 to be adjusted in the second direction and the third direction, and enables the position of the photographing device in the second photographing component 3 to be adjusted in the first direction and the second direction.

When the thickness of the first detected member 10 is relatively small, after the photographing device is disposed at a predetermined height, an entire image in a height direction can be captured even if the height of the first detected member 10 is slightly changed. Therefore, position adjustment of the first photographing component 2 for photographing the first detected member 10 in the first direction can be omitted. This simplifies a structure of the first adjustment component 5 for adjusting the photographing device in the first photographing component 2, and also helps simplify an assembly process, shorten time required for switching and retooling, and improve detection efficiency.

Because the second detected member 20 has a cylindrical shape, it is not necessary to adjust the position of the photographing device in the second photographing component 3 in the third direction, and the photographing device in the second photographing component 3 is disposed such that the position thereof can be adjustable in the first direction and the second direction, so that a structure of the first adjustment component 5 for adjusting the photographing device in the second photographing component 3 can be simplified. This helps simplify an assembly process, shorten time required for switching and retooling, and improve detection efficiency.

In some embodiments of the present application, the first adjustment component 5 including the first adjustment member 51, the second adjustment member 52, and the third adjustment member 53 is disposed, so that the first adjustment component 5 can perform position adjustment in three mutually perpendicular directions, thereby supporting position adjustment of the first photographing component 2 and the second photographing component 3 in three directions. In addition, one or a plurality of the first adjustment member 51, the second adjustment member 52, and the third adjustment member 53 can be freely selected and disposed for the first photographing component 2 and the second photographing component 3 based on characteristics of a photographed object, thereby simplifying a structure and mounting.

In some embodiments, a number of the first adjustment components 5 is the same as a number of the photographing devices, to independently adjust a position of each photographing device by using the first adjustment component 5.

A dedicated first adjustment component 5 is disposed for each photographing device, so that the position of each photographing device can be independently adjusted, and position adjustment of each photographing device is not limited by position arrangement of another photographing device. This helps improve photographing quality.

In some embodiments, the first adjustment member 51 is provided with a first mounting hole 511 for connecting to the bracket 1 and a second mounting hole 512 for connecting to the second adjustment member 52, the second adjustment member 52 is provided with a third mounting hole 521 for connecting to the first adjustment member 51 and a fourth mounting hole 522 for connecting to the photographing device, the third adjustment member 53 is provided with a fifth mounting hole 531 for connecting to the bracket 1 and a sixth mounting hole 532 for connecting to the second adjustment member 52, the second mounting hole 512 is an oblong hole whose length direction extends in the first direction, the fourth mounting hole 522 is an oblong hole whose length direction extends in the second direction, and the sixth mounting hole 532 is an oblong hole whose length direction extends in the third direction.

The first adjustment member 51 is connected to the bracket 1 through the first mounting hole 511, the second adjustment member 52 is connected to the first adjustment member 51 through the second mounting hole 512 and the third mounting hole 521, the third adjustment member 53 is connected to the bracket 1 through the fifth mounting hole 531, and the third adjustment member 53 is connected to the second adjustment member 52 through the sixth mounting hole 532.

In some embodiments, the first adjustment component 5 further includes a first connection member connecting the first adjustment member 51 and the bracket 1, a second connection member connecting the second adjustment member 52 and the first adjustment member 51, a third connection member connecting the third adjustment member 53 and the bracket 1, a fourth connection member connecting the third adjustment member 53 and the second adjustment member 52, and a fifth connection member connecting the second adjustment member 52 and the photographing device.

A first hole may be disposed on the bracket 1, and the first connection member passes through the first hole and the first mounting hole 511 to connect the first adjustment member 51 and the bracket 1. The second connection member passes through the second mounting hole 512 and the third mounting hole 521 to connect the second adjustment member 52 and the first adjustment member 51. A second hole is disposed on the bracket 1, and a third connection member passes through the second hole and the fifth mounting hole 531 to connect the third adjustment member 53 and the bracket 1. The second adjustment member 52 is provided with a tenth mounting hole 524, and a fourth connection member passes through the sixth mounting hole 532 and the tenth mounting hole 524 to connect the third adjustment member 53 and the second adjustment member 52. The photographing device is provided with a third hole, and a fifth connection member passes through the third hole and the fourth mounting hole 522 to connect the second adjustment member 52 and the photographing device.

The first connection member, the second connection member, the third connection member, the fourth connection member, and the fifth connection member may be bolts, screws, pins, or the like.

In some embodiments, the first adjustment member 51 is provided with a seventh mounting hole 513 for connecting to the second adjustment member 52, the seventh mounting hole 513 is a circular hole, and the second mounting hole 512 is arc-shaped; and/or the length direction of the second mounting hole 512 is parallel to the second direction; and/or the third adjustment member 53 is provided with an eighth mounting hole 533 for connecting to the second adjustment member 52, the eighth mounting hole 533 is a circular hole, and the sixth mounting hole 532 is arc-shaped.

The seventh mounting hole 513 is disposed, so that the first adjustment member 51 and the second adjustment member 52 can be connected through the second mounting hole 512 and the seventh mounting hole 513. The seventh mounting hole 513 is a circular hole, and the second mounting hole 512 is arc-shaped, so that the first adjustment member 51 can swing with respect to the second adjustment member 52 in the length direction of the second mounting hole 512 around a connection position of the seventh mounting hole 513, thereby adjusting the position of the photographing device in the first direction.

The eighth mounting hole 533 is disposed, so that the second adjustment member 52 and the third adjustment member 53 can be connected through the sixth mounting hole 532 and the eighth mounting hole 533. The eighth mounting hole 533 is a circular hole, and the sixth mounting hole 532 is arc-shaped, so that the third adjustment member 53 can swing with respect to the second adjustment member 52 in the length direction of the sixth mounting hole 532 around a connection position of the eighth mounting hole 533, thereby adjusting the position of the photographing device in the third direction.

In some embodiments, the first adjustment component 5 further includes a sixth connection member for connecting the first adjustment member 51 and the second adjustment member 52, and a seventh connection member for connecting the third adjustment member 53 and the second adjustment member 52.

The second adjustment member 52 is provided with a ninth mounting hole 523 and an eleventh mounting hole 525, and the sixth connection member passes through the seventh mounting hole 513 and the ninth mounting hole 523 to connect the first adjustment member 51 and the second adjustment member 52. The seventh connection member passes through the eighth mounting hole 533 and the eleventh mounting hole 525 to connect the third adjustment member 53 and the second adjustment member 52.

In some embodiments, the fourth mounting hole 522 is strip-shaped.

In some embodiments, at least one of the second mounting hole 512, the fourth mounting hole 522, and the sixth mounting hole 532 is provided with a scale. The scale is disposed, so that a magnitude of position adjustment can be more accurately controlled, which helps implement more accurate adjustment.

In some embodiments, the battery appearance detection device further includes a first light source 6 and a second light source 7 that are mounted on the bracket 1, where the first light source 6 has a strip shape, and the second light source 7 has a ring shape.

The strip-shaped first light source 6 and the ring-shaped second light source 7 are disposed, so that strip light and ring light can be respectively provided for the first photographing component 2 and the second photographing component 3, to improve brightness on a side surface of the detected member, increase a contrast between a defective portion and a non-defective portion, and improve imaging quality.

In some embodiments, there are two first light sources 6, the two first light sources 6 are arranged opposite to each other, the first detected member 10 has a rectangular cuboid shape, and the first light source 6 is substantially parallel to one of diagonals of the first detected member 10.

Two first light sources 6 are disposed, and the two first light sources 6 are arranged opposite to each other and are substantially parallel to one of the diagonals of the first detected member 10, so that an imaging requirement can be substantially met, and costs can be greatly reduced as compared with a solution in which four first light sources are disposed.

In some embodiments, the battery appearance detection device further includes a second adjustment component 8, where the second adjustment component 8 is configured to adjust a position of the first light source 6 in at least one of a fourth direction D1, a fifth direction D2, and a sixth direction D3, the fourth direction D1 is parallel to the vertical direction, the fifth direction D2 is perpendicular to the sixth direction D3, and both the fifth D2 direction and the sixth direction D3 are perpendicular to the fourth direction D1.

The second adjustment component 8 is disposed, so that the position of the first light source 6 can be adjusted in three mutually perpendicular directions, and the detection device can adjust the position of the first light source 6 based on requirements of the first photographing component 2 and the second photographing component 3, so as to achieve a good imaging effect.

Figure 8:
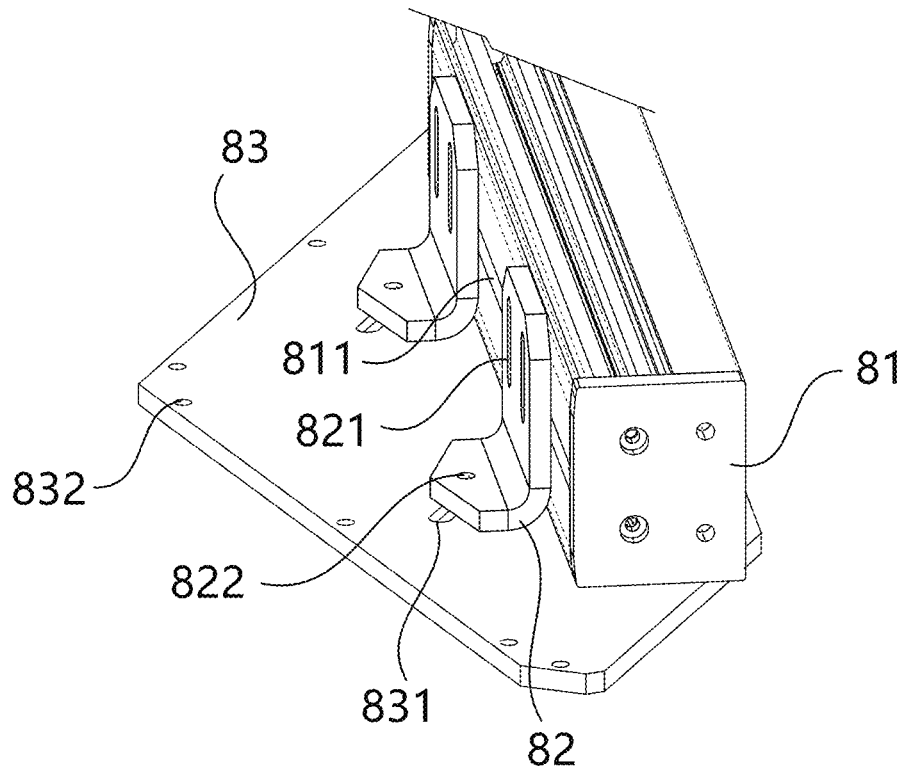
FIG. 8 is a schematic diagram of a structure of a second adjustment component in some embodiments of a battery appearance detection device disclosed in the present application.

As shown in FIG. 8, in some embodiments, the second adjustment component 8 includes a mounting base 81, a first mounting plate 82, and a second mounting plate 83, the first light source 6 is mounted on the mounting base 81, the mounting base 81 is provided with a first connection hole 811 for connecting to the first mounting plate 82, the first mounting plate 82 is provided with a second connection hole 821 for connecting to the mounting base 81 and a third connection hole 822 for connecting to the second mounting plate 83, the second mounting plate 83 is provided with a fourth connection hole 831 for connecting to the first mounting plate 82 and a fifth connection hole 832 for connecting to the bracket 1, the first connection hole 811 is an oblong hole whose length direction extends in the fifth direction, the second connection hole 821 is an oblong hole whose length direction extends in the fourth direction, and at least one of the third connection hole 822 and the fourth connection hole 831 is an oblong hole whose length direction extends in the sixth direction.

The position of the first light source 6 in the fifth direction can be adjusted by disposing the first connection hole 811 as an oblong hole, the position of the first light source 6 in the fourth direction can be adjusted by disposing the second connection hole 821 as an oblong hole, and the position of the first light source 6 in the sixth direction can be adjusted by disposing at least one of the third connection hole 822 and the fourth connection hole 831 as an oblong hole.

In some embodiments, the first light source 6 is disposed below the first photographing component 2.

The first light source 6 is disposed below the first photographing component 2, so that interference between the first light source 6 and the first photographing component 2 can be avoided. In addition, it helps use the first light source 6 below to illuminate the first detected member 10 and the second detected member 20, so as to improve imaging quality of the first photographing component 2 and the second photographing component 3.

In some embodiments, the battery appearance detection device further includes a third adjustment component 9, where the third adjustment component 9 is configured to adjust a position of the second light source 7 in the vertical direction.

The third adjustment component 9 is disposed, so that the position of the second light source 7 in the vertical direction can be adjusted, to facilitate adjustment of the position of the second light source 7 as required.

As shown in FIG. 3, in some embodiments, the third adjustment component 9 includes a third mounting plate 91 and a fourth mounting plate 92. The third mounting plate 91 is mounted on an outer side surface of the second light source 7. The fourth mounting plate 92 is provided with a fifth connection hole. The fifth connection hole is an oblong hole. A length direction of the fifth connection hole extends in the vertical direction. The fourth mounting plate 92 is connected to the third mounting plate 91 through the fifth connection hole. The fourth mounting plate 92 is mounted on the bracket 1.

The third adjustment component 9 may further include an eighth connection member and a ninth connection member. The third mounting plate 91 is provided with a sixth connection hole and a seventh connection hole. The second light source 7 is provided with an eighth connection hole. The eighth connection member passes through the sixth connection hole and the eighth connection hole to connect the third mounting plate 91 and the second light source 7. The ninth connection member passes through the fifth connection hole and the seventh connection hole to connect the fourth mounting plate 92 and the third mounting plate 91.

The eighth connection member and the ninth connection member may be bolts, screws, pins, or the like.

In the embodiment of the battery appearance detection device provided in the present application, the first detected member 10 and the second detected member 20 may be integral parts of the battery, such as a post or an explosion-proof valve, or may be the battery itself. Certainly, the detected member is not limited to the battery, and may be any other product or part that requires appearance detection.

With reference to FIG. 1 to FIG. 11, a structure of an embodiment of the battery appearance detection device provided in the present application is described below.

As shown in FIG. 1 and FIG. 2, the battery appearance detection device includes a bracket 1 and four first photographing components 2 and four second photographing components 3 that are mounted on the bracket 1.

The four first photographing components 2 are divided into two groups, each group includes two photographing devices, and the two groups of first photographing components 2 are arranged opposite to each other. The four second photographing components 3 are arranged at regular intervals in a circumferential direction. One group of first photographing components 2 is located between two second photographing components 3, and the other group of first photographing components 2 is located between the other two second photographing components 3.

As shown in FIG. 3, the battery appearance detection device further includes a first adjustment component 5, a first light source 6, a second light source 7, a second adjustment component 8, and a third adjustment component 9.

The bracket 1 is in a shape of an octagonal prism as a whole. The bracket 1 includes a bracket body 11 and a cover plate 12 mounted above the bracket body 11. The bracket body 11 has a specific height. Accommodation space is provided inside the bracket body 11. The first photographing component 2, the second photographing component 3, the first adjustment component 5, the first light source 6, the second light source 7, the second adjustment component 8, and the third adjustment component 9 are all disposed below the cover plate 12 and located in the accommodation space of the bracket body 11 to avoid interference of an external light source by using the bracket body 11.

The first photographing component 2 includes two first connection plates 21, and the two first connection plates 21 are mounted on the bracket 1 to be opposite to each other. Two photographing devices are mounted on each first connection plate 21. The second photographing component 3 includes four second connection plates 31, and the four second connection plates 31 are mounted on the bracket 1 at equal intervals in a circumferential direction. One photographing device is mounted on each second connection plate 31.

The first adjustment component 5 is used to adjust a mounting position and an angle of the photographing device. Each photographing device is provided with a set of first adjustment components 5, but a structure of a first adjustment component 5 corresponding to the photographing device in the first photographing component 2 is different from a structure of a first adjustment component 5 corresponding to the photographing device in the second photographing component 3.

Two strip-shaped first light sources 6 are arranged opposite to each other, and are each mounted on the bracket 1 by using a corresponding second adjustment component 8. A ring-shaped second light source 7 is disposed at a center of the bracket 1, and is mounted on the bracket 1 by using the third adjustment component 9.

The third adjustment component 9 includes a third mounting plate 91, a fourth mounting plate 92, an eighth connection member, and a ninth connection member. The third mounting plate 91 is provided with a sixth connection hole and a seventh connection hole. The second light source 7 is provided with an eighth connection hole. The eighth connection member passes through the sixth connection hole and the eighth connection hole to connect the third mounting plate 91 to an outer side surface of the second light source 7. The fourth mounting plate 92 is provided with a fifth connection hole. The fifth connection hole is an oblong hole. A length direction of the fifth connection hole extends in a vertical direction. The ninth connection member passes through the fifth connection hole and the seventh connection hole to connect the fourth mounting plate 92 and the third mounting plate 91. The fourth mounting plate 92 is further provided with a tenth connection hole, and a tenth connection member passes through the tenth connection hole and a mounting hole on the bracket 1 to mount the fourth mounting plate 92 on the bracket 1.

Figure 4:
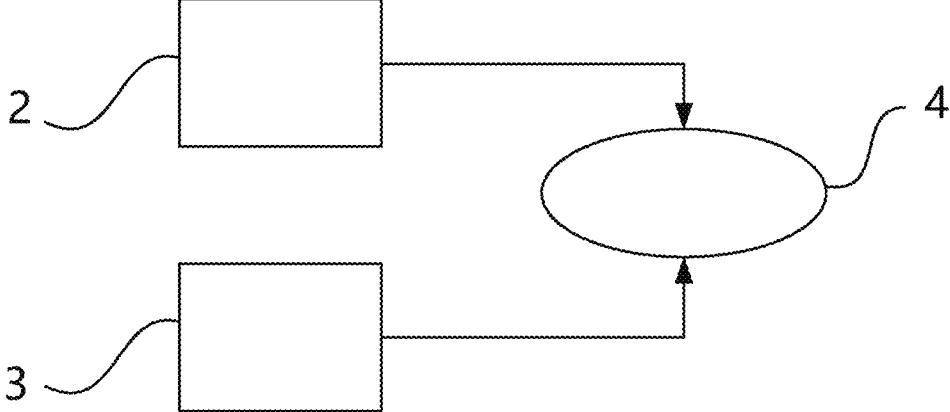
FIG. 4 is a diagram of a detection principle of some embodiments of a battery appearance detection device disclosed in the present application.

As shown in FIG. 4, the identification device 4 is signal-connected to the first photographing component 2 and the second photographing component 3 to receive photos captured by the first photographing component 2 and the second photographing component 3 and identify defects of the first detected member 10 and the second detected member 20 based on the photos.

As shown in FIG. 5, FIG. 6, and FIG. 7, the first adjustment component 5 includes a first adjustment member 51, a second adjustment member 52, and a third adjustment member 53. A position of the photographing device in a first direction can be adjusted by using the first adjustment member 51, a position of the photographing device in a second direction can be adjusted by using the second adjustment member 52, and a position of the photographing device in a third direction can be adjusted by using the third adjustment member 53.

Each of the first adjustment member 51 and the third adjustment member 53 is block-shaped. The second adjustment member 52 is U-shaped. The first adjustment member 51 is mounted on one side of the second adjustment member 52, an opening of the second adjustment member 52 faces downward, the third adjustment member 53 is mounted on the top of the second adjustment member 52, and the photographing device is mounted inside the U-shaped structure.

Although the entire structure of the first adjustment component 5 includes a total of three adjustment members: the first adjustment member 51, the second adjustment member 52, and the third adjustment member 53, only the second adjustment member 52 and the third adjustment member 53 may be mounted without mounting the first adjustment member 51 when the photographing device in the first photographing component 2 is assembled, only the first adjustment member 51 and the second adjustment member 52 may be mounted without mounting the third adjustment member 53 when the photographing device in the second photographing component 3 is assembled, or the third adjustment member 53 is be connected to the bracket 1 even if the third adjustment member 53 is mounted on the second adjustment member 52. Otherwise, the position of the photographing device in the vertical direction cannot be adjusted.

As shown in FIG. 5, the top of the first adjustment member 51 is provided with a first mounting hole 511. The first adjustment member 51 is further provided with a second mounting hole 512 and a seventh mounting hole 513 that penetrate through left and right side surfaces.

Each of the first mounting hole 511 and the seventh mounting hole 513 is a circular hole. The second mounting hole 512 is an oblong hole whose length direction extends in the first direction, and is arc-shaped. The first direction is parallel to the vertical direction.

As shown in FIG. 6, a side surface of the second adjustment member 52 is provided with a third mounting hole 521 and a ninth mounting hole 523, and the top of the second adjustment member 52 is provided a fourth mounting hole 522, a tenth mounting hole 524, and an eleventh mounting hole 525.

Each of the third mounting hole 521, the ninth mounting hole 523, the tenth mounting hole 524, and the eleventh mounting hole 525 is a circular hole. The fourth mounting hole 522 is an oblong hole whose length direction extends in the second direction, and has a strip shape. The second direction extends in a direction toward and away from the first detected member 10 and the second detected member 20. The second direction is perpendicular to the first direction.

As shown in FIG. 7, the top of the third adjustment member 53 is provided with two fifth mounting holes 531, one sixth mounting hole 532, and one eighth mounting hole 533 that penetrate vertically.

Each of the fifth mounting hole 531 and the eighth mounting hole 533 is a circular hole. The sixth mounting hole 532 is an oblong hole whose length direction extends in the third direction, and is arc-shaped. The third direction is perpendicular to both the first direction and the second direction.

A connection manner of the three adjustment members and the bracket 1 is described below.

A first hole is disposed on the bracket 1, and a first connection member passes through the first hole and the first mounting hole 511 to connect the first adjustment member 51 and the bracket 1.

A second connection member passes through the second mounting hole 512 and the third mounting hole 521, and a sixth connection member passes through the seventh mounting hole 513 and the ninth mounting hole 523 to connect the first adjustment member 51 and the second adjustment member 52.

The photographing device is provided with a third hole, and a fifth connection member passes through the fourth mounting hole 522 and the third hole to connect the second adjustment member 52 and the photographing device.

A fourth connection member passes through the sixth mounting hole 532 and the tenth mounting hole 524, and an seventh connection member passes through the eighth mounting hole 533 and the eleventh mounting hole 525 to connect the third adjustment member 53 and the second adjustment member 52.

A second hole is disposed on the bracket 1, and a third connection member passes through the second hole and the fifth mounting hole 531 to connect the third adjustment member 53 and the bracket 1.

As shown in FIG. 8, the second adjustment component 8 includes a mounting base 81, a first mounting plate 82, and a second mounting plate 83. The first mounting plate 82 is L-shaped.

The first light source 6 is mounted on the mounting base 81. The mounting base 81 is provided with a first connection hole 811, and the first connection hole 811 is an oblong hole whose length direction extends in a fifth direction. The first mounting plate 82 is provided with a second connection hole 821 and a third connection hole 822, the second connection hole 821 is an oblong hole whose length direction extends in the vertical direction, and the third connection hole 822 is a circular hole. The second mounting plate 83 is provided with a fourth connection hole 831 and a fifth connection hole 832, the fourth connection hole 831 is an oblong hole that extends in a sixth direction, and the fifth connection hole 832 is a circular hole.

A connection member passes through the second connection hole 821 and the first connection hole 811 to connect the first mounting plate 82 and the mounting base 81. A connection member passes through the third connection hole 822 and the fourth connection hole 831 to connect the first mounting plate 82 and the second mounting plate 83. A connection member passes through the fifth connection hole 832 and a hole on the bracket 1 to connect the second mounting plate 83 and the bracket 1.

As shown in FIG. 9, central axes of the four photographing devices used to photograph the first detected member 10 are respectively collinear with centers of side surfaces that are of the first detected member 10 and that are photographed by the four photographing devices. In addition, angles $\alpha$ and $\beta$ between the central axis of the photographing device and a perpendicular line perpendicular to the side surface that is of the first detected member 10 and that is photographed by the photographing device are less than 90°.

As shown in FIG. 10 and FIG. 11, a condition that needs to be met by a depth of field D of the photographing device is: $D \geq \max(d1*\sin\gamma, d2*\sin\sigma)$, d1 is the length of a first cross section that is of the first detected member 10 and that is perpendicular to a vertical direction, d2 is the width of the first cross section, $\gamma = \arctan(d1/2d2)$, and $\sigma = \arctan(d2/2d1)$.

With this placement, a relationship among the position of the photographing device, an adjustment range of the first adjustment component, the length and the width of the first detected member, model parameters of the photographing device, and the like can be well balanced, and a good imaging effect can be obtained, thereby improving quality of appearance detection.

The above descriptions of the various embodiments tend to emphasize differences between the various embodiments. For same or similar parts thereof, refer to these embodiments. For brevity, details are not described herein again.

Although this application has been described with reference to some preferred embodiments, various modifications to this application and replacements of the components therein with equivalents can be made without departing from the scope of this application. In particular, the technical features mentioned in the embodiments may be combined in any manner provided that there is no structural conflict. The present application is not limited to the specific embodiments disclosed herein, but includes all technical solutions falling within the scope of the claims.

What is claimed is:

1. A battery appearance detection device, comprising:
a bracket having an accommodation space, said accommodation space arranged to receive either a first detected member of a first battery or a second detected member of a second battery, wherein the first detected member has a rectangular cuboid shape, and the second detected member has a cylindrical shape;
a first photographing component, mounted on the bracket, wherein the first photographing component comprises a plurality of first connection plates mounted on the bracket and a first plurality of photographing devices configured to be detachably mounted to the first connection plates, wherein the first photographing component is configured to capture an appearance photo of said first detected member when the first detected member is arranged in the accommodation space;
a second photographing component, mounted on the bracket, wherein the second photographing component comprises a plurality of second connection plates mounted on the bracket and a second plurality of photographing devices configured to be detachably mounted to the second connection plates, wherein the second photographing component is configured to capture an appearance photo of the second detected member when the second detected member is arranged in the accommodation space; and
an identification device, signal-connected to the first photographing component and the second photographing component, wherein the identification device is configured to: identify an appearance defect of the first detected member based on the photo captured by the first photographing component, and identify an appearance defect of the second detected member based on the photo captured by the second photographing component; wherein
the first plurality of photographing devices of the first photographing component comprises four photographing devices, the four photographing devices being equally divided into two groups, and the two groups of photographing devices being arranged opposite to each other.

2. The battery appearance detection device according to claim 1, wherein central axes of the four photographing devices are respectively collinear with centers of side surfaces of the first detected member that are photographed by the four photographing devices.

3. The battery appearance detection device according to claim 2, wherein an angle between the central axis of the photographing device and a perpendicular line perpendicular to the side surface that is of the first detected member and that is photographed by the photographing device is less than 90°.

4. The battery appearance detection device according to claim 1, wherein a depth of field D of the photographing device is greater than or equal to a larger value between d1*sin γ and d2*sin σ, d1 is the length of a first cross section that is of the first detected member and that is perpendicular to a vertical direction, d2 is the width of the first cross section, $\gamma=\arctan(d1/2d2)$, and $\sigma=\arctan(d2/2d1)$.

5. The battery appearance detection device according to claim 1, wherein the second plurality of photographing devices of the second photographing component comprises four photographing devices arranged at regular intervals in a circumferential direction.

6. A battery appearance detection device, comprising:
a bracket having an accommodation space, said accommodation space arranged to receive either a first detected member of a first battery or a second detected member of a second battery, wherein the first detected member has a rectangular cuboid shape, and the second detected member has a cylindrical shape;
a first photographing component, mounted on the bracket, wherein the first photographing component is configured to capture an appearance photo of said first detected member when the first detected member is arranged in the accommodation space;
a second photographing component, mounted on the bracket, wherein the second photographing component is configured to capture an appearance photo of the second detected member when the second detected member is arranged in the accommodation space; and
an identification device, signal-connected to the first photographing component and the second photographing component, wherein the identification device is configured to: identify an appearance defect of the first detected member based on the photo captured by the first photographing component, and identify an appearance defect of the second detected member based on the photo captured by the second photographing component;
the device further comprising a first adjustment component, wherein the first adjustment component comprises a first adjustment member, a second adjustment member, and a third adjustment member, the first photographing component and/or the second photographing component comprise/comprises a photographing device, the first adjustment member is configured to adjust a position of the photographing device in a first direction, the second adjustment member is configured to adjust a position of the photographing device in a second direction, the third adjustment member is configured to adjust a position of the photographing device in a third direction, the first direction is parallel to the vertical direction, the second direction is a direction toward or away from the first detected member or the second detected member, the second direction is perpendicular to the first direction, and the third direction is perpendicular to both the first direction and the second direction;
wherein the first adjustment member is provided with a first mounting hole for connecting to the bracket and a second mounting hole for connecting to the second adjustment member, the second adjustment member is provided with a third mounting hole for connecting to the first adjustment member and a fourth mounting hole for connecting to the photographing device, the third adjustment member is provided with a fifth mounting hole for connecting to the bracket and a sixth mounting hole for connecting to the second adjustment member, the second mounting hole is an oblong hole whose length direction extends in the first direction, the fourth mounting hole is an oblong hole whose length direction extends in the second direction, and the sixth mounting hole is an oblong hole whose length direction extends in the third direction.

7. The battery appearance detection device according to claim 6, wherein the first adjustment member is provided with a seventh mounting hole for connecting to the second adjustment member, the seventh mounting hole is a circular hole, and the second mounting hole is arc-shaped; and/or the length direction of the second mounting hole is parallel to the second direction; and/or the third adjustment member is provided with an eighth mounting hole for connecting to the second adjustment member, the eighth mounting hole is a circular hole, and the sixth mounting hole is arc-shaped.

8. The battery appearance detection device according to claim 6, wherein at least one of the second mounting hole, the fourth mounting hole, and the sixth mounting hole is provided with a scale.

9. A battery appearance detection device, comprising:
a bracket having an accommodation space, said accommodation space arranged to receive either a first detected member of a first battery or a second detected member of a second battery;
a first photographing component, mounted on the bracket, wherein the first photographing component is configured to capture an appearance photo of said first detected member when the first detected member is arranged in the accommodation space;
a second photographing component, mounted on the bracket, wherein the second photographing component is configured to capture an appearance photo of the second detected member when the second detected member is arranged in the accommodation space, and the first detected member and the second detected member have different shapes;
an identification device, signal-connected to the first photographing component and the second photographing component, wherein the identification device is configured to: identify an appearance defect of the first detected member based on the photo captured by the first photographing component, and identify an appearance defect of the second detected member based on the photo captured by the second photographing component; and a first light source and a second light source that are mounted on the bracket, wherein the first light source has a strip shape, and the second light source has a ring shape;
the device further comprising a second adjustment component, wherein the second adjustment component is configured to adjust a position of the first light source in at least one of a fourth direction, a fifth direction, and a sixth direction, the fourth direction is parallel to the vertical direction, the fifth direction is perpendicular to the sixth direction, and both the fifth direction and the sixth direction are perpendicular to the fourth direction;
wherein the second adjustment component comprises a mounting base, a first mounting plate, and a second mounting plate, the first light source is mounted on the mounting base, the mounting base is provided with a first connection hole for connecting to the first mounting plate, the first mounting plate is provided with a second connection hole for connecting to the mounting base and a third connection hole for connecting to the second mounting plate, the second mounting plate is provided with a fourth connection hole for connecting to the first mounting plate and a fifth connection hole for connecting to the bracket, the first connection hole is an oblong hole whose length direction extends in the fifth direction, the second connection hole is an oblong hole whose length direction extends in the fourth direction, and at least one of the third connection hole and the fourth connection hole is an oblong hole whose length direction extends in the sixth direction.

10. The battery appearance detection device according to claim 9, wherein there are two first light sources, the two first light sources are arranged opposite to each other, the first detected member has a rectangular cuboid shape, and the first light source is substantially parallel to one of diagonals of the first detected member.

11. The battery appearance detection device according to claim 9, wherein the first light source is disposed below the first photographing component.

12. The battery appearance detection device according to claim 9, further comprising a third adjustment component, wherein the third adjustment component is configured to adjust a position of the second light source in the vertical direction.

* * * * *